US009154616B2

(12) United States Patent
Myer et al.

(10) Patent No.: US 9,154,616 B2
(45) Date of Patent: Oct. 6, 2015

(54) WEARABLE CAPTURE AND COMMUNICATION

(75) Inventors: Suki Myer, San Jose, CA (US); Warren H. Myer, San Jose, CA (US)

(73) Assignee: OIA INTELLECTUALS, INC., San Jose, CA (US)

( * ) Notice: Subject to any disclaimer, the term of this patent is extended or adjusted under 35 U.S.C. 154(b) by 305 days.

(21) Appl. No.: 11/252,495

(22) Filed: Oct. 18, 2005

(65) Prior Publication Data

US 2007/0207793 A1   Sep. 6, 2007

(51) Int. Cl.
G04F 1/00    (2006.01)
H04M 3/42   (2006.01)
H04B 1/3827 (2015.01)
H04M 3/00   (2006.01)

(52) U.S. Cl.
CPC ........... *H04M 3/42221* (2013.01); *H04B 1/385* (2013.01); *G04F 1/005* (2013.01); *H04M 3/00* (2013.01)

(58) Field of Classification Search
CPC ........... H04M 3/00; G04B 47/06; G04F 1/005
USPC .......................................................... 368/10
See application file for complete search history.

(56) References Cited

U.S. PATENT DOCUMENTS

| | | | | |
|---|---|---|---|---|
| 1,840,563 A * | 1/1932 | Brosius, Jr. | ................. | 24/11 CT |
| 4,701,862 A * | 10/1987 | Washizuka et al. | ........... | 704/274 |
| 5,699,089 A * | 12/1997 | Murray | ......................... | 715/823 |
| 6,002,779 A * | 12/1999 | Johnston | ......................... | 381/80 |
| 6,218,964 B1 * | 4/2001 | Ellis | ............................... | 340/990 |
| 6,714,486 B2 * | 3/2004 | Biggs | .............................. | 368/82 |
| 6,993,355 B1 * | 1/2006 | Pershan | ........................ | 455/518 |
| 7,054,594 B2 * | 5/2006 | Bloch et al. | ................... | 455/41.2 |
| 7,734,023 B2 * | 6/2010 | Bettis et al. | ................. | 379/88.25 |
| 7,774,315 B1 * | 8/2010 | Galker | ........................... | 707/644 |
| 7,903,795 B2 * | 3/2011 | Hiatt et al. | .................... | 379/88.12 |
| 7,966,293 B1 * | 6/2011 | Owara et al. | .................. | 707/654 |
| 8,494,478 B1 * | 7/2013 | Ponnangath | ................ | 455/343.2 |
| 2004/0057340 A1 * | 3/2004 | Charles-Erickson et al. | .. | 368/10 |
| 2004/0204044 A1 | 10/2004 | Pinsky et al. | | |

* cited by examiner

*Primary Examiner* — Sean Kayes

(74) *Attorney, Agent, or Firm* — Raj Abhyanker, P.C.

(57) ABSTRACT

A method, system and device for wearable capture and communication are disclosed. In one embodiment, a method includes capturing a sensory data when a recording module of a wearable device is enables. The sensory data is wirelessly communicated to a remote storage device. An output data may be automatically generated on the wearable device based on a command received wirelessly through a network communicatively coupled with the remote storage device and the wearable device. At least one parameter associated with the wearable device may be remotely programmed based on a configuration data received in a network enabled application. The at least one parameter may include a transmission interval, a recording quality threshold, a wireless range threshold, a communication group, a language selection, a communication identifier associated with a non-wearable communication device, a time of day setting, and/or a location of the remote storage device.

18 Claims, 10 Drawing Sheets

| WEARABLE COMMUNICATION DEVICE ID | RECORDED DATE & TIME | RECORDED DATA TYPE | SIZE OF RECORDED DATA | FORMAT OF RECORDED DATA | LANGUAGE | COMMUNICATION GROUP ID | OTHER(S) |
|---|---|---|---|---|---|---|---|
| 1111-2222 | 0811P091105 | AUDIO | 100K | .DSS | ENGLISH | | |
| 3333-4444 | 1122A091205 | PICTURE | 2M | .GIF | N/A | | |
| ○ | ○ | ○ | ○ | ○ | ○ | | |
| ○ | ○ | ○ | ○ | ○ | ○ | | |
| ○ | ○ | ○ | ○ | ○ | ○ | | |

FIGURE 4

WEARABLE CAPTURE AND COMMUNICATION

FIELD OF TECHNOLOGY

This disclosure relates generally to the field of data capture, and, in one example embodiment, to a method, an apparatus, and a system associated with wearable capture and communication.

BACKGROUND

A digital recorder may be a recording device that enables a user to process (e.g., capture, store, play, delete, etc.) data (e.g., audio data such as a voice conversation, music, etc.). Because the digital recorder may store the data directly on the digital recorder, the digital recorder, it may require longer battery power (e.g., double AA batteries) to operate (e.g., because of built in memory, storage, and/or processing circuitry). Furthermore, to temporarily store the data, the digital recorder may require a storage space that is sizable (e.g., currently hundreds of megabytes, though in the future may be larger). As such, the user may have to delete some of the data stored on the digital recorder to account for limitations of the storage space and to capture new data.

The digital recorder may be physically large and heavy (e.g., six inches by six inches, weighing a few kilograms, etc.) because it may allow the user to review the data (e.g., listen, play, delete, etc.) manually (e.g., by utilizing buttons such as fast forward and/or rewind until a target data file is reached, and/or by requiring the user to remember a message number). The digital voice recorder may not be portable in size because the digital voice recorder may have to include the memory space, a microphone, a speaker, a physical connection circuitry, and/or a number of buttons (e.g., play, pause, delete, fast forward, rewind, etc.).

To transfer, permanently store, and/or process (e.g., upload and/or download) the data, the digital recorder may have to be physically connected through an interface port on the digital recorder to a data processing system (e.g., a personal computer) through a connector cable (e.g., a universal serial bus (USB) cable) between the digital recorder and the data processing system. If the user were to not upload existing audio data before new audio data is captured, the existing audio data may be deleted permanently (e.g., because the storage space may be limited).

A wrist-watch (e.g., worn on a human wrist with a watch-strap made of materials such as leather, metal, and/or nylon, etc) is a small portable clock that displays the current time and/or sometimes the current day, date, month and/or year. The wrist-watch may be a digital device (e.g., created using a piezoelectric crystal such as quartz as an oscillator). The wrist-watch is a one-way device, that is used only to display information (e.g., rather than to capture information such as the digital recorder).

SUMMARY

Wearable capture and communication is disclosed. In one aspect, a method includes capturing a sensory data (e.g., an audio data, a text data, a picture data, and/or a video data) when a recording module of a wearable device (e.g., a watch communication device) is enabled (e.g., through an interface module having a wireless communication circuitry); and wirelessly communicating the sensory data to a remote storage device (e.g., a server with a database). Communicating the sensory data (e.g., to and from the wearable device) may be automatically performed on a periodic interval of every 5 minutes while the sensory data may be temporarily buffered in a memory module of the wearable device between each of the periodic intervals.

The method may further include automatically generating an output data (e.g., the audio data, the text data, the picture data, and/or the video data) on the wearable device based on a command received through a network that connects the remote storage device and the wearable device. The remote storage device may be used to organize the sensory data by at least one of a date, a time, a size, a type, a format, and a language. The sensory data may also be used in the remote storage device to process (e.g., convert, transcribe, etc.) the sensory data from the audio data into the text data and/or vice versa by utilizing at least one of a transcription module and/or a text-reader module. The remote storage device may also include a language translation module to translate the sensory data into at least one of a plurality of global languages (e.g., from English to Hindi, Spanish, Korean, etc.).

A parameter (e.g., a transmission interval, a recording quality threshold, a wireless range threshold, a communication group, a language selection, a communication identifier associated with a non-wearable communication device, a time of day setting, and/or a location of the remote storage device, etc.) associated with the wearable device may be remotely programmed based on a configuration data received in a network enabled application.

The method may include a digital clock displayed on the wearable device having a liquid crystal display and a band to fasten the wearable device, and to encompass a biological external tissue (e.g., human skin) with the wearable device. The wearable device may be a two way messaging system that communicates data (e.g., an audio data, a text data, a picture data, and/or a video data) through an Internet network with an alphanumeric keypad to communicate a text message through the Internet network.

In another aspect, a system includes analyzing a sensory data provided through a network by examining a meta-data (e.g., a data describing the sensory data) with the sensory data, and communicating a parameter threshold setting (e.g., a transmission interval, a communication identifier associated with a non-wearable communication device, etc.) at least partially derived from the sensory data to a wearable device. The system may include a network, a wearable device to express the sensory data of an environment encompassing the wearable device, and a data processing system to process (e.g., capture, record, convert, store, etc.) the sensory data through the network and to apply an algorithm to analyze the sensory data. The data processing system may also analyze the sensory data by utilizing a resolution module to organize the sensory data based on a user input.

In yet another aspect, an apparatus may be a wrist watch which has a recording module to capture a present-sense impression data of an environment encompassing the wrist watch, a clock module to time stamp the present-sense impression data, a memory module to buffer the present-sense impression data during a phased time interval, and an interface module to wirelessly transmit the present-sense impression data to at least one recipient device at the completion of each of the phased time interval. The various operations (e.g., methods) described herein may be in a form of a machine-readable medium embodying a set of instructions that, when executed by a machine, cause the machine to perform the method.

Other features will be apparent from the accompanying drawings and from the detailed description that follows.

BRIEF DESCRIPTION OF THE DRAWINGS

Example embodiments are illustrated by way of example and not limitation in the Figures of the accompanying drawings, in which like references indicate similar elements and in which:

FIG. 4 is a table view of the output table as described in FIG. 3, according to one embodiment.

Other features of the present embodiments will be apparent from the accompanying drawings and from the detailed description that follows.

DETAILED DESCRIPTION

Wearable capture and communication is disclosed. In the following description, numerous specific details are set forth in order to provide a thorough understanding of various embodiments. It will be evident, however, to one skilled in the art that the various embodiments may be practiced without these specific details. An example embodiment provides methods and systems to capture a sensory data using a wearable device when a recording module of the wearable device is enabled and to communicate the sensory data as a communication data wirelessly to a remote storage device (e.g., a data processing system 104) through a network when an interface device of the wearable device is enabled. Example embodiments of a method and a system, as described below, may also be used to process the communication data from the remote storage device to produce an output data via the wearable device. It will be appreciated that the various embodiments discussed herein may/may not be the same embodiment, and may be grouped into various other embodiments not explicitly disclosed herein.

Figure 1:
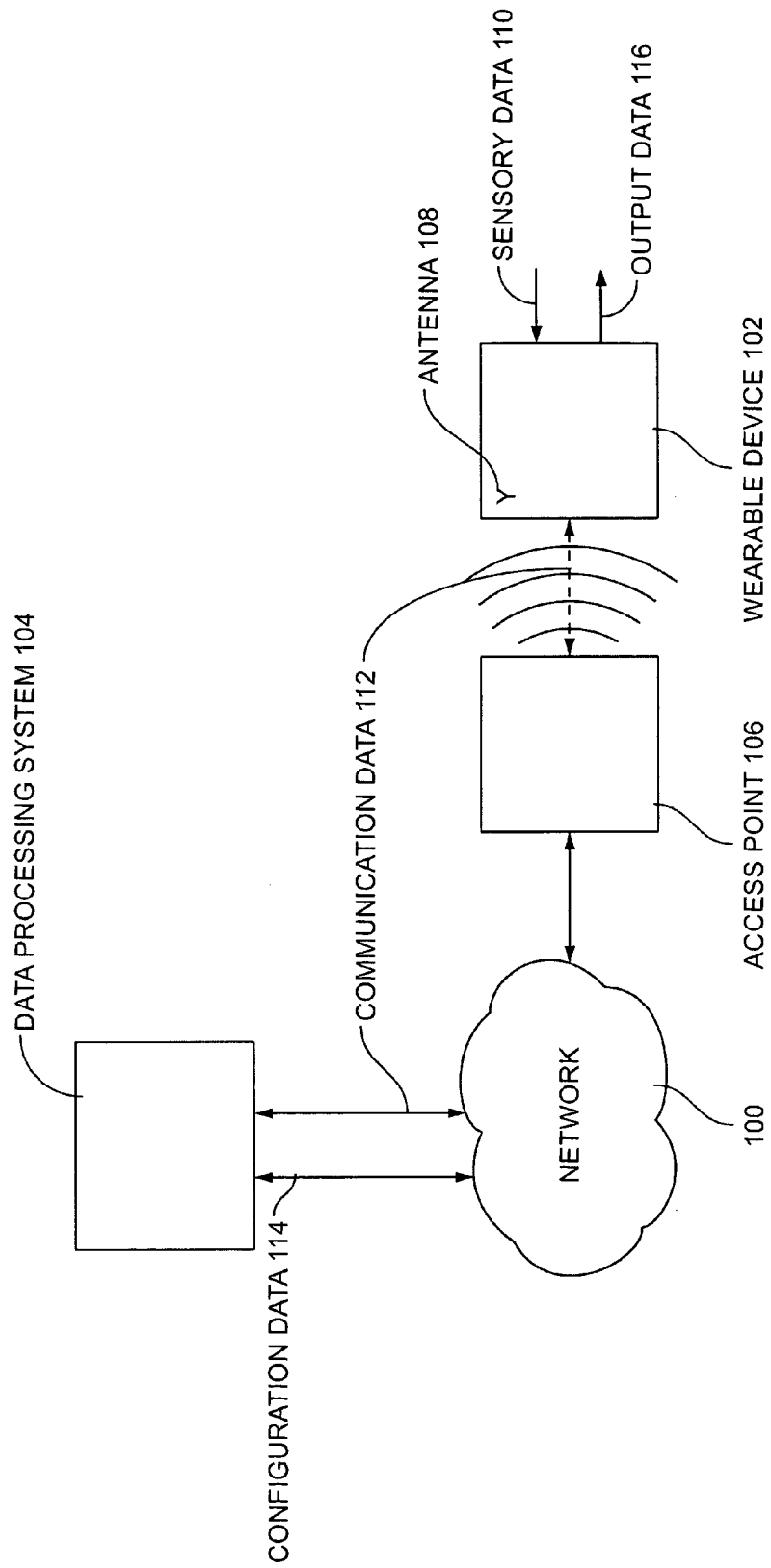
FIG. 1 is a block diagram of a network which connects a wearable device to a data processing system, according to one embodiment.

FIG. 1 is a block diagram of a network 100 (e.g., a WAN, LAN, etc.) which connects a wearable device 102 to a data processing system 104, according to one embodiment. In FIG. 1, the wearable device 102 may receive a sensory data 110 (e.g., an audio data, a text data, a picture data, a video data, etc.), may transform the sensory data 110 to a communication data 112 (e.g., in digital signal), and may send the communication data 112 to an access point 106 (e.g., a transceiver) through an antenna 108. The wearable device 102 also may produce an output data 116 (e.g., the audio data, the text data, the picture data, the video data, etc.) when the wearable device 102 receives and processes (e.g., decodes, decompresses, etc.) the communication data 112 wirelessly from the access point 106. The access point 106 may carry the communication data 112 to and from the network 100.

The network 100 of FIG. 1 may also be used to transfer (e.g., send and receive) the communication data 112 to and from the data processing system 104 (e.g., a server, a remote storage device, etc.), which processes the communication data 112. The network 100 may be used to communicate a configuration data 114 (e.g., a location of a remote storage device, a recording quality threshold, a wireless range threshold, a language selection, a time of day setting, etc.) to and from the data processing system 104. Another example embodiment of methods and systems may analyze the sensory data 110 provided through the network 100 by examining a meta-data (e.g., describing the sensory data) associated with the sensory data; and may communicate a parameter setting at least partially derived from the sensory data 110 (e.g., range, volume, etc.) to the wearable device 102.

Figure 2:
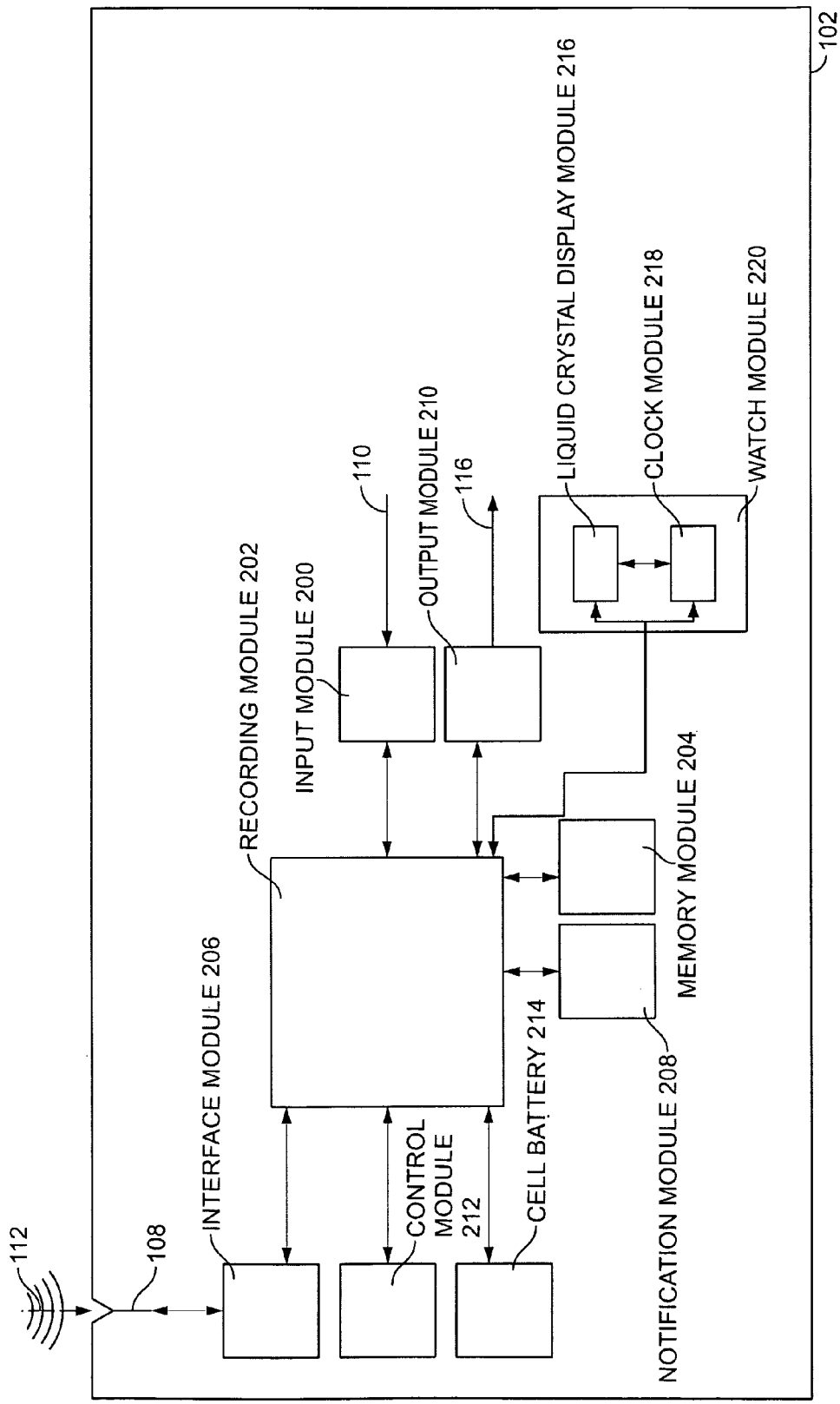
FIG. 2 is an exploded view of the wearable device of FIG. 1 associated with the data processing system of FIG. 1, according to one embodiment.

FIG. 2 is an exploded view of the wearable device 102 of FIG. 1 associated with the data processing system 104, according to one embodiment. In FIG. 2, an input module 200 (e.g., an encoder, a compressor, and/or an encryptor in the form of a hardware circuit) of the wearable device 102 may convert (e.g., by performing analog-to-digital conversion (ADC) and/or compression of data) the sensory data 110 into the communication data 112.

Next, a recording module 202 may capture and store the communication data 112 from the input module 200 in a memory module 204 (e.g., a flash memory module), and then may send the communication data 112 stored in the memory module 204 to an interface module 206 (e.g., a miniature Wi-Fi module having a wireless communication circuitry that may not require a physical and/or direct connection to the remote storage device each time the sensory data 110 needs to be uploaded and/or downloaded) when the interface module is enabled (e.g., every five minutes, whenever the interface module 206 is active, whenever a recording of a message is completed, whenever the wearable device 102 is turned on, etc.).

The interface module 206 may provide an interface between the recording module 202 of the wearable device 102 and the access point 106 of FIG. 1 to transmit and/or receive the communication data 112 through an antenna 108. When the communication data 112 that is received by the interface module 206 from the access point 106 through the antenna 108 is processed (e.g., captured, stored, etc.) by the recording module 202, a user of the wearable device 102 may be notified (e.g., by a vibration, an auditory sound, a visual display, etc.) of an arrival of the communication data 112 via a notification module 208. The communication data 112 processed by the recording module 202 may be received by an output module 210 (e.g., the output module 210 may be a decoder, a decompressor, and/or a decryptor in the form of the hardware circuit that performs digital-to-analog conversion (DAC)) to produce the output data 116 of FIG. 1.

A watch module 220 connected to the recording module 202 may include a liquid crystal display module 216 and a clock module 218. The clock module 218 may include a digital clock displayed on the wearable device 102 to time stamp the communication data 112 when the communication data 112 is stored in the memory module 204. A control module 212 which is attached to the recording module 202 may be used to enhance the functionality of the wearable device 102 (e.g., by providing a user interface control which turns the wearable device 102 on and off, moves a cursor on the liquid crystal display module 216, adjusts a volume of a speaker embedded in the wearable device 102, etc.). A cell battery 214 which connects to the recording module 202 may be used to sustain (e.g., by providing an electricity) the operation of the wearable device 102.

Figure 3:
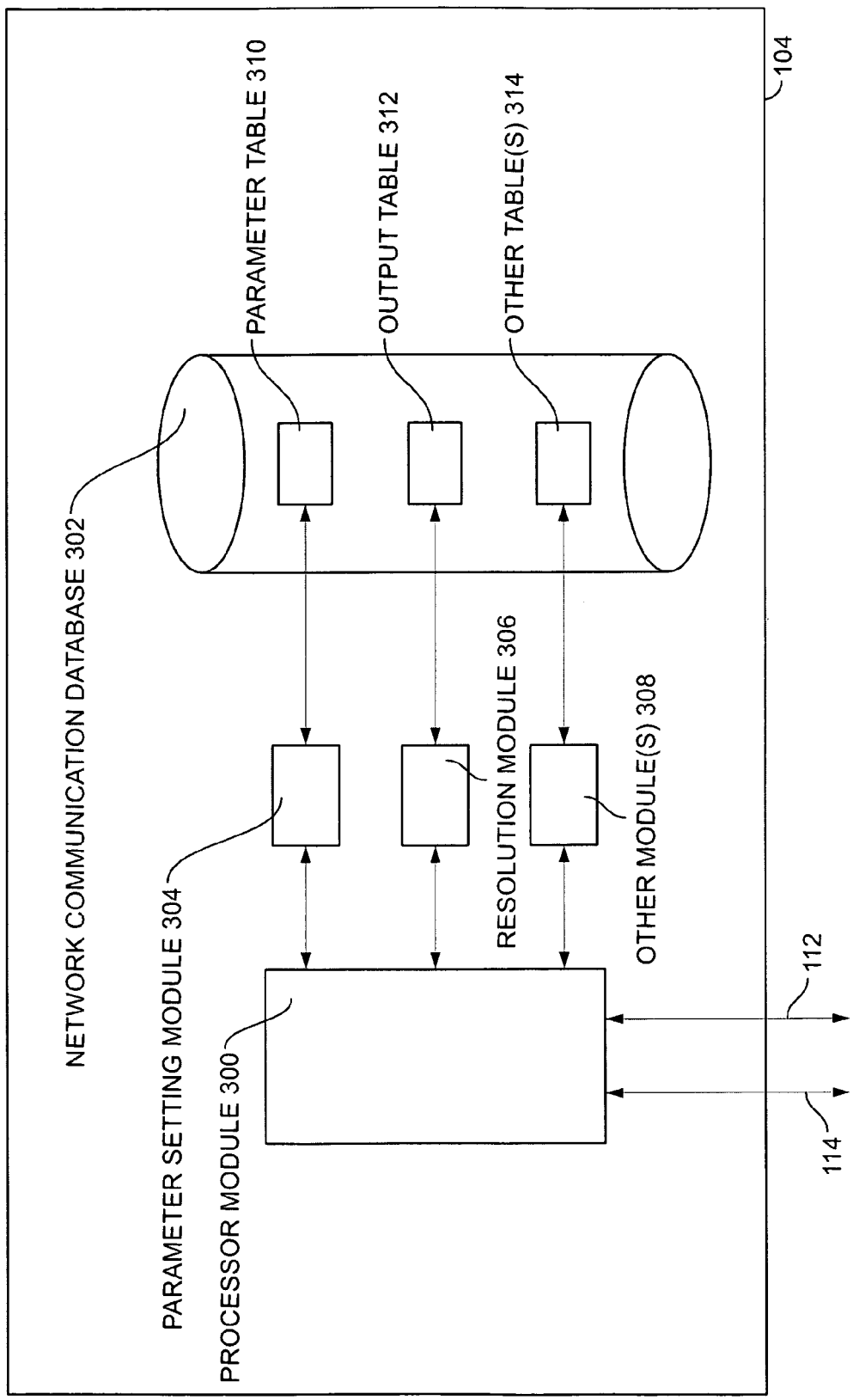
FIG. 3 is an exploded view of the data processing system which connects to the wearable device through the network of FIG. 1, according to one embodiment.

FIG. 3 is a block diagram of the data processing system 104 (e.g., a server), which connects to the wearable device 102 through the network 100, according to one embodiment. A processor module 300 (e.g., a processor with memories) of the data processing system 104 may receive and process (e.g., capture remotely) the communication data 112 and/or the configuration data 114 to enable a parameter setting module 304, a resolution module 306, and/or an other module(s) 308 to create a parameter table 310, an output table 312, and an other table(s) 314 of a network communication database 302.

The parameter setting module 304 may be programmed to remotely process (e.g., receive and/or perform an algorithm) the configuration data 114 to set a parameter (e.g., a transmission interval, a recording quality threshold, a wireless range threshold, a communication group, a language selection, a time of day setting, a location of the remote storage device, a communication device(s) attached to the data processing system, etc.) for the wearable device 102, and may create the parameter table 310 within the network communication database 302. The resolution module 306 may process (e.g., analyzes) the communication data 112 to determine data characteristics (e.g., a data type, a data size, a data format, a data language, a recorded time of data, etc.) of the communication data 112, and may create the output table 312 which may include the data characteristics in the network communication database 302.

The other module(s) 308 may include a voice-to-text conversion module (e.g., a transcription module), a text-to-voice conversion module (e.g., a text-reader module), a language translation module, etc. The voice-to-text conversion module may transform a voice data into a text data (e.g., to store a transcribed data), and then send the text data and/or the voice data to store in the network communication database 302. The text-to-voice conversion module may transform the text data into the voice data (e.g., to remind a blind user), and then may send the voice data and/or the text data to store in the network communication database 302. The language translation module (e.g., to break language barriers) may transform the communication data 112 from language A (e.g., English) to language B (e.g., Spanish), and then may send both the communication data 112 in language B and/or language A to store in the network communication database 302 using the processor module 300.

FIG. 4 is a table view of the output table 312 as described in FIG. 3, according to one embodiment. The output table 312 may include a wearable communication device identification field 400, a recorded date and time field 402, a recorded data type field 404, a size of recorded data field 406 (e.g., 100K, 2M, etc.), a format of recorded data field 408 (e.g., .dss, gif, .doc, etc.), a language field 410, a communication group identification field 412, and an other field(s) 414. The wearable communication device identification field 400 may be an identification number assigned to the wearable communication device 102 which is enabled by the network data processing system 104 of FIG. 1. The recorded data and time field 402 may record a reception time and date of the communication data 112 to the network communication database 302. The recorded data type field 404 may include a type (e.g., an audio data, a text data, a picture data, a video data, etc.) of the communication data 112. The language field 410 may display a language type (e.g., English, Korean, etc.) of the communication data 112 stored in the network communication database 302. The communication group identification field 412 may indicate a group identification of the wearable device 102 which is enabled by the data processing system 104. The other field(s) 414 may have any other data that may be useful to the data processing system 104.

Figure 5:
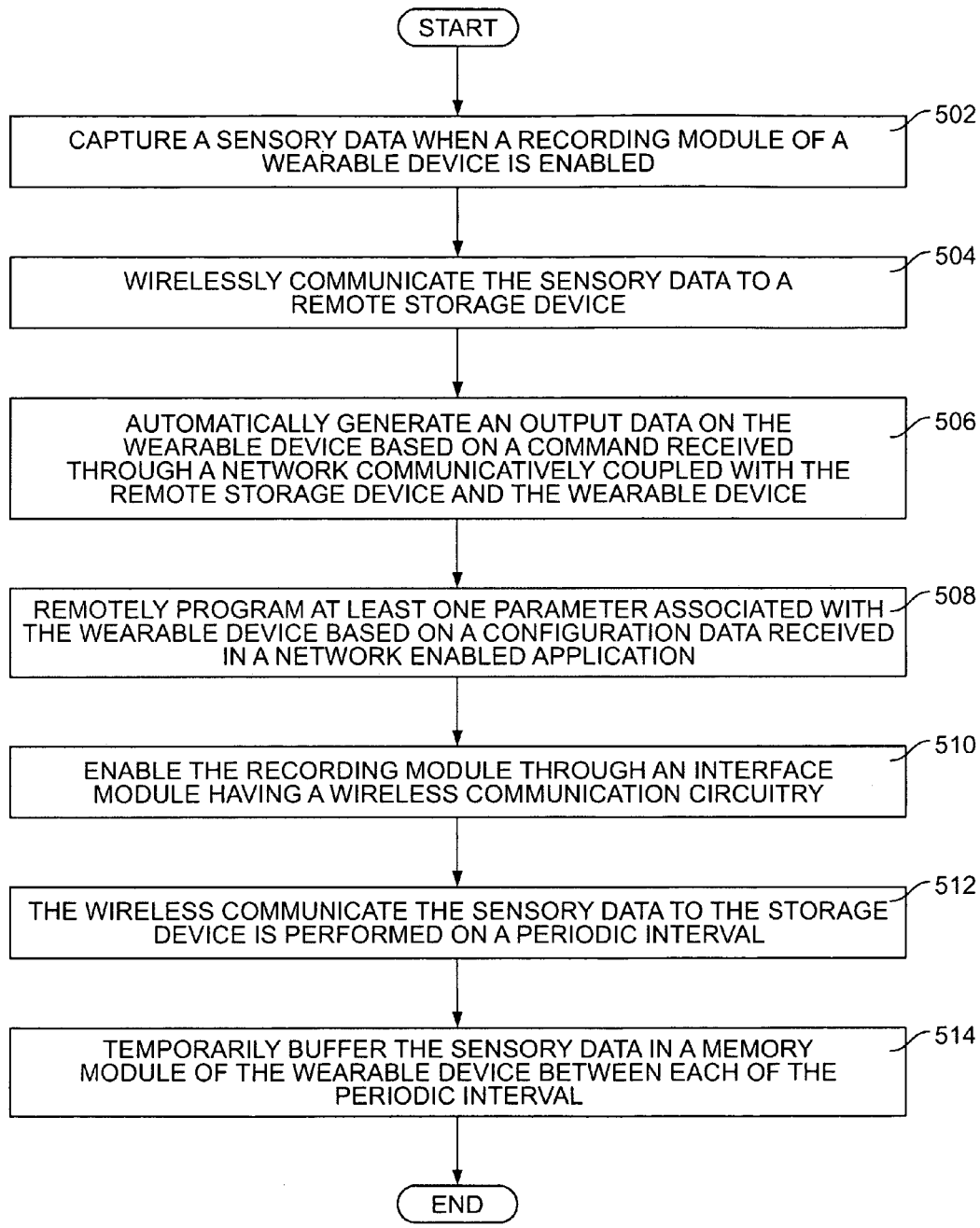
FIG. 5 is a process flow to capture the sensory data of FIG. 1 and FIG. 2, and wirelessly communicate the sensory data to the remote storage device, according to one embodiment.

FIG. 5 is a process flow to capture the sensory data 110 of FIG. 1 and FIG. 2, wirelessly communicate the sensory data 110 of to the remote storage device (e.g., a server with a database), according to one embodiment. In operation 502, the recording module 202 of FIG. 2 may capture (e.g., store in the memory module 204) the sensory data 110 when the recording module 202 of the wearable device 102 is enabled (e.g., by turning on the wearable device 102). In operation 504, the wearable device 102 may wirelessly (e.g., using a Wi-Fi module) communicate (e.g., transmit) the sensory data captured in the memory module 204 to the remote storage device when the interface module 206 of the wearable device 102 is enabled (e.g., enabled according to a periodic interval of 5 minutes).

In operation 506, the output data 116 (e.g., used to remind a co-worker, a family member, and/or a friend who is not carrying a cell phone or other two-way communication device) of FIG. 1 and FIG. 2 may be generated on the wearable device 102 on a command (e.g., the command based on the configuration data 114 which may enable the output module 210 of the wearable device 102) received wirelessly through the network 100. In operation 508, a two-way messaging device (e.g., a cell phone, a PDA, a computer, the wearable device 102) may be used to remotely program at least one parameter (e.g., the transmission interval, the recording quality threshold, the wireless range threshold, the communication group, the language selection, the time of day setting, the location of the remote storage device, the communication device(s) attached to the data processing system, etc.) associated with the wearable device 102 based on the configuration data 114 received in a network enabled application. The recording module 202, according to operation 510 may be enabled (e.g. to store the sensory data 110 captured in the remote storage device) through the interface module 206 having a wireless communication circuitry (e.g., a Wi-Fi module). In operation 512, the sensory data 110 captured by the recording module 202 may be communicated wirelessly to the remote storage device on a periodic interval (e.g., communicated every five minutes to conserve the cell battery and to minimize a memory space needed in the memory module 204). The memory module 204, in operation 514, may be used to temporarily buffer the sensory data between the periodic intervals.

Figure 6:
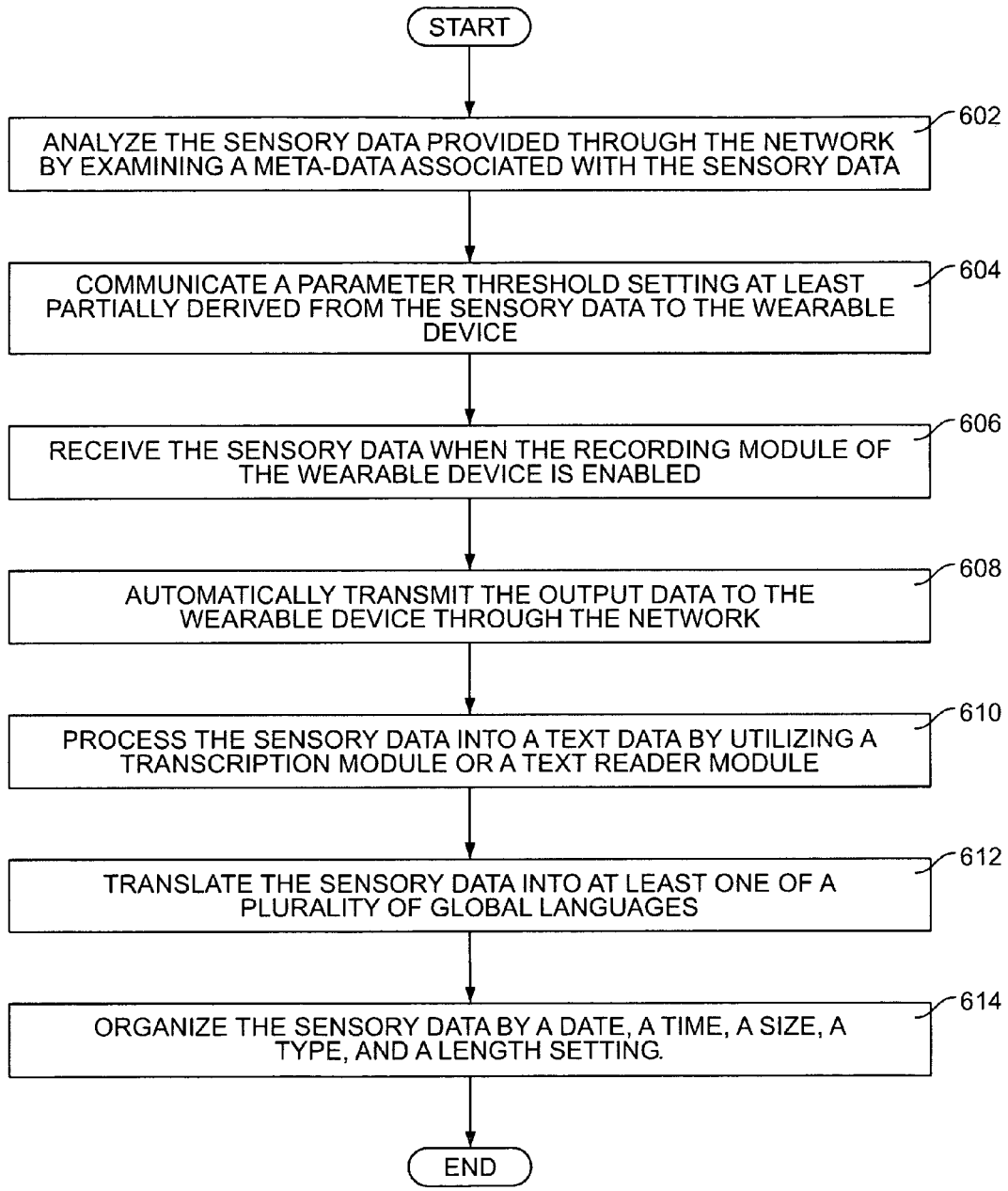
FIG. 6 is a process flow to communicate a parameter threshold setting derived from the sensory data of FIG. 1 and FIG. 2 to the wearable device, according to one embodiment.

FIG. 6 is a process flow to communicate a parameter threshold setting (e.g., the recording quality threshold, the wireless range threshold, etc.) derived from the sensory data 110 of FIG. 1 and FIG. 2 to the wearable device 102, according to one embodiment. In operation 602, the sensory data 110 communicated through the network 100 may be analyzed in the resolution module 306 of FIG. 3 by examining a metadata (e.g., describing a date, a time, a size, a type, and/or a length setting) associated with the sensory data 110.

In operation 604, the parameter threshold setting at least partially derived from the sensory data 110 may be communicated to the wearable device 102 (e.g., to set the recording quality and/or the wireless range threshold of the wearable device 102). The remote storage device of FIG. 3 (e.g., the network communication database 302) may receive the sensory data 110 in operation 606 when the recording module 202 of the wearable device 102 in FIG. 2 is enabled (e.g., by turning on the wearable device 102 using the control module 212 or by sending the command to the wearable device 102 through the network 100).

In operation 608, the output data 116 of FIG. 1 and FIG. 2 may be automatically transmitted to the wearable device 102 through the network 100 (e.g., when the interface module 206 of the wearable device 102 is enabled). In operation 610, the data processing system 104 may be used to convert the sensory data (e.g., the audio data) into a text data or the text data into the sensory data (e.g., the audio data) by utilizing a transcription module and/or a text-reader module. In operation 612, the sensory data 110 may be translated using a translation module into at least one of a plurality of global languages (e.g., English to Spanish, Korean to English, or vice versa, etc.). The sensory data 110 may also be organized by the meta-data of the sensory data 110 (e.g., by the recorded date, the recorded time, the size, the type, the length setting, etc.).

Figure 7:
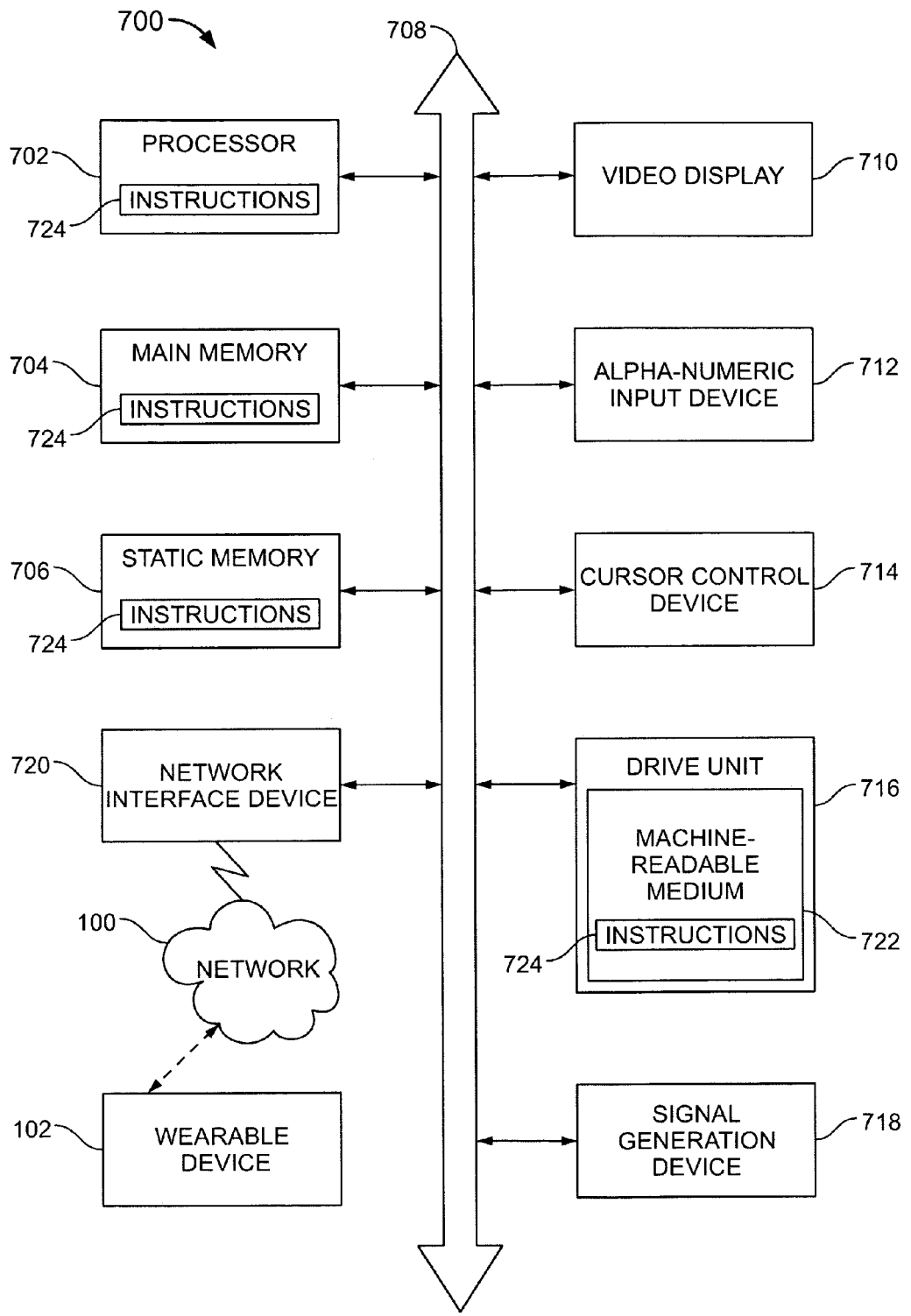
FIG. 7 is a diagrammatic representation of the wearable device associated with the data processing system capable of processing a set of instructions to perform any one or more of the methodologies disclosed herein, according to one embodiment.

FIG. 7 is a diagrammatic representation of the wearable device 102 associated with the data processing system 104 capable of processing a set of instructions to perform any one or more of the methodologies, according to one embodiment. In various embodiments, the data processing system 104 operates as a standalone device and/or may be connected (e.g., networked through the network 100) to other machines. In a network deployment, the data processing system 104 may operate in the capacity of a server which connects to a client machine (e.g., the wearable device 102). While only one of the data processing system 104 is displayed in FIG. 1, the data processing system 104 may be any one or any collection of a personal computer (PC), a tablet PC, a set-top box (STB), a personal digital assistant (PDA), a cellular telephone, a web appliance, a network router, a switch and/or a bridge, an embedded system, and/or any machine capable of executing a set of instructions (sequential and/or otherwise) that specify actions to be taken by the machine.

One example of the data processing system 104 may include a processor 702 (e.g., a central processing unit (CPU) or the CPU and a graphics processing unit (GPU)), a main memory 704, and a static memory 706, which communicate to each other via a bus 708. The data processing system 104 may further include a video display unit 710 (e.g., a liquid crystal display (LCD) and/or a cathode ray tube (CRT)), an alphanumeric input device 712 (e.g., a keyboard), a cursor control device 714 (e.g., a mouse), a disk drive unit 716, a signal generation device 718 (e.g., a speaker), and a network interface device 720.

The disk drive unit 716 may include a machine-readable medium 722 on which is stored one or more sets of instructions (e.g., instructions 724) embodying any one or more of the methodologies and/or functions described herein. The instruction 724 may also reside, completely and/or at least partially, within the main memory 704 and/or within the processor 702 during the execution thereof by the data processing system 104, wherein the main memory 704 and the processor 702 may also constitute machine-readable media.

The instructions 724 may further be transmitted and/or received over the network 100 via the network interface device 720. While the machine-readable medium 722 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" should also be taken to include any medium that is capable of storing, encoding, and/or carrying a set of instructions for execution by the machine and that causes the machine to perform any one or more of the methodologies of the various embodiments. The "machine-readable medium" shall accordingly be taken to include, but not limited to, solid-state memories, optical and magnetic media, and carrier wave signals.

Figure 8:
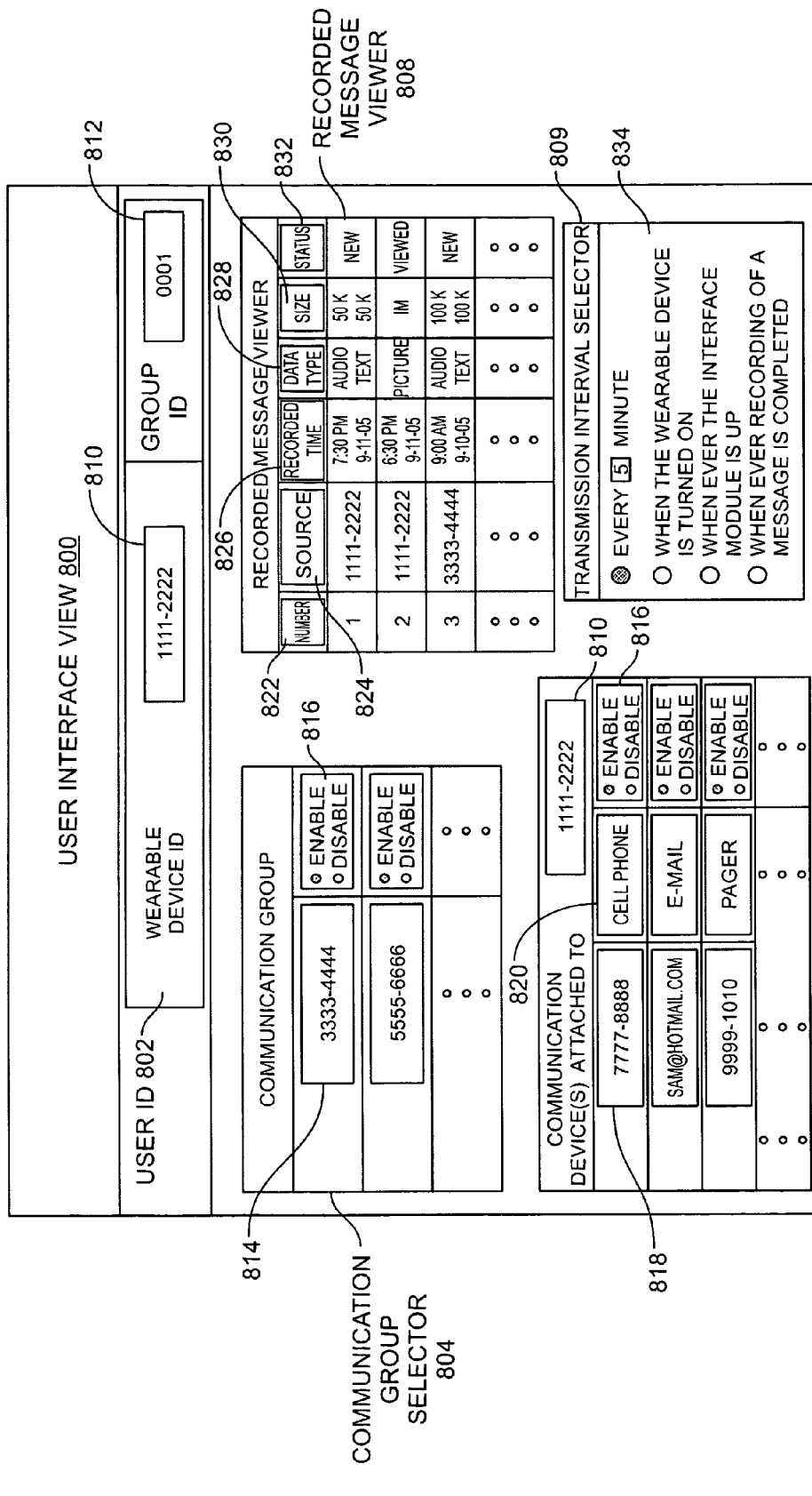
FIG. 8 is a user interface view of the data processing system, according to one embodiment.

FIG. 8 is a user interface view 800 of the data processing system 104, according to one embodiment. The user interface view 800 may include a user identification (ID) 802, a communication group selector 804, a selector for communication device(s) attached to the wearable device 806, a recorded message viewer 808, and a transmission interval selector 809. The user ID 802 may include a wearable device ID 810 and a group ID 812 (e.g., only the wearable device(s) which has the same group ID 812 may communicate with each other). The communication group selector 804 may include an ID (e.g., TCP/IP address) of the wearable device 814 and an enable/disable selection button 816. A user may be able to assign the ID(s) of the wearable device(s) 814 to the group ID 812 and temporarily enable or disable the wearable device 102.

The selector for communication device(s) attached to the wearable device 806 (e.g., the communication device(s) listed here may receive recorded messages from the wearable device 102 having the user ID 802) may include a communication device ID 818 (e.g., a cell phone number, an email address, a pager number, etc.), a type of the communication device 820 (e.g., cellular phone, email, pager, etc.), and the enable/disable selection button 816. The recorded message viewer 808 may include a number of message 822 (e.g., based on a sorting order), a source of message 824 (e.g., the ID of the wearable device 814 and/or the communication device ID 818), a recorded time 826 (e.g., recorded time and/or day), a data type 828 (e.g., audio, text, picture, video, etc.), a size of data 830 (e.g., 50K, 1M, etc.), and a status of message 832 (e.g., viewed, new, etc.).

The transmission interval selector 809 may allow the user to select a transmission interval 834 (e.g., every 5 minutes, when the wearable device is turned on, whenever the interface module is up, whenever recording of a message is completed, etc.)

Figure 9:
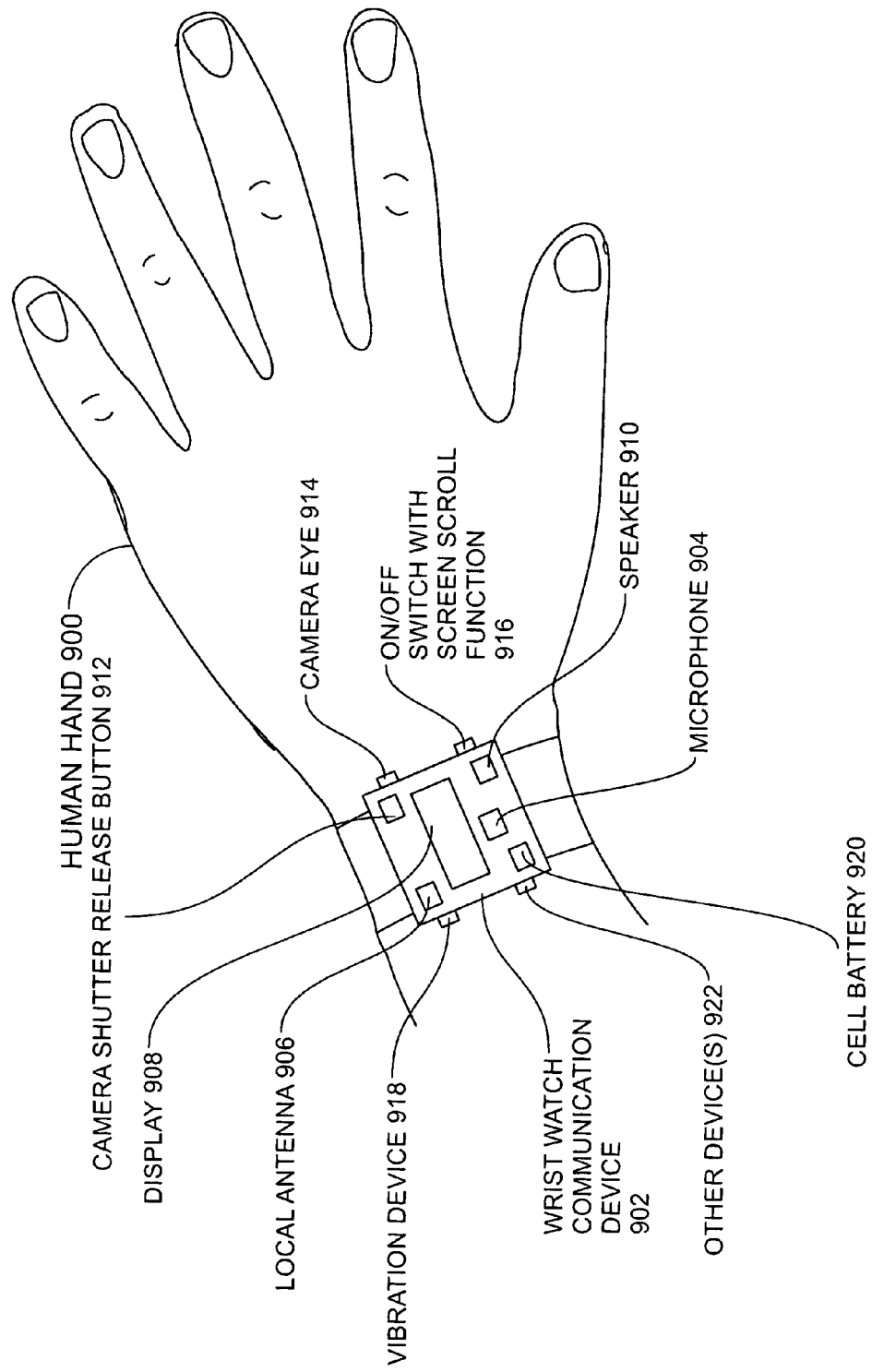
FIG. 9 is an apparatus view of a wrist watch communication device worn on a wrist of a human, according to one embodiment.

FIG. 9 is an apparatus view of a wrist watch communication device 902 worn on a wrist of a human hand 900, according to one embodiment of the wearable device 102. The wrist watch communication device 902 (e.g., easier to carry around, record data, and/or use) may include a microphone 904, an antenna 906, a LCD display 908, a speaker 910, a camera shutter release button 912, a camera eye 914, an on/off switch with screen scroll function 916, a vibration device 918 (e.g., using a micro motor), a cell battery 920, an other device(s) 922 (e.g., an alphanumeric key pad), and a band to fasten the wearable device and to encompass a biological external tissue with the wearable device. In another example embodiment, the wrist watch communication device 902 may include the recording module 202 that may capture a present-sense impression data of an environment encompassing the wrist watch communication device 902; the clock module 218 that may time stamp the present-sense impression data; the memory module 204 that may buffer the present-sense impression data during a phased time interval; and the interface module 206 of FIG. 2 that may wirelessly transmit the present-sense impression data to at least one recipient device at the completion of each of the phased time interval.

Figure 10:
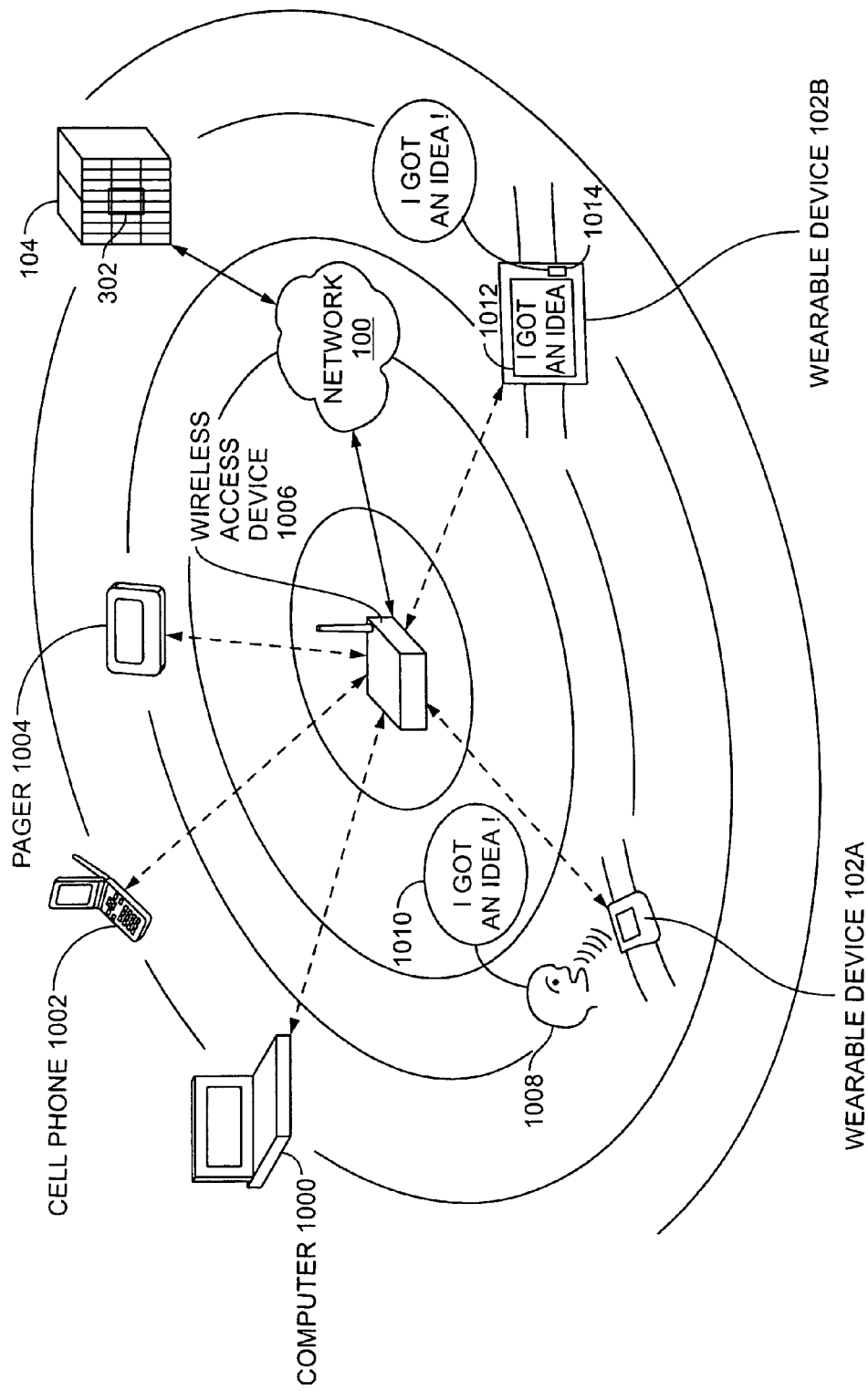
FIG. 10 is an interaction view between the wearable device(s) of FIG. 1 and various devices including a wireless access device(s), the network, the data processing system, a computer, a cell phone, and a pager, according to one embodiment.

FIG. 10 is an interaction view between the wearable device(s) 102 of FIG. 1 and various devices including a wireless access device(s) 1006, the network 100, the data processing system 104, a computer 1000, a cell phone 1002, and a pager 1004, according to one embodiment. In FIG. 10, a user 1008 is illustrated as recording a message 1010 to the wearable device 102A. The message 1010 (e.g., an audio data) may be displayed (e.g., in text) on a LCD 1012 of the wearable device 102B and/or may be generated (e.g., in audio) on a speaker 1014 of the wearable device 102B after the message 1010 is communicated through the wireless access device(s) 1006, the network 100, and the data processing system 104. In another example embodiment, the wearable device 102B may be a sender device and the wearable device 102A may be a receiver device. The message may be also stored in the network communication database 302, and sent to the computer 1000, the cell phone 1002, and the pager 1004. The computer 1000, the cell phone 1002, and other available user interface device(s) may be used to configure the data processing system 104 and the wearable device 102. The user 1006 may also be able to view the message(s) 1010 stored in the network communication database 302 through the user interface view 800. In yet another embodiment, the wearable device 102 may be a two-way messaging system that communicates data (e.g., at least one or more of an audio data, a text data, a picture data, and a video data) through an internet network (e.g., so that it makes cheaper to use the two-way messaging system).

Although the present embodiments have been described with reference to a specific example embodiment, it will be evident that various modifications and changes may be made to these embodiments without departing from the broader sprit and scope of the invention. For example, the various modules, processors, memories, etc. described herein may be performed and created using hardware circuitry (e.g., CMOS based logic circuitry), firmware, software and/or any combination of hardware, firmware, and/or software (e.g., embodied in a machine readable medium).

For example, the input module 200, the recording module 202, the memory module 204, the interface module 206, the notification module 208, the output module 210, the control module 212, the liquid crystal display module 216, the clock module 218, the processor module 300, the parameter setting module 304, and/or the resolution module 306 may be embodied using transistors, logic gates, and electrical circuits (e.g., application specific integrated ASIC circuitry) using an input circuit, a recording circuit, a memory circuit, an interface circuit, a notification circuit, an output circuit, a control circuit, a liquid crystal display circuit, a clock circuit, a processor circuit, a parameter setting circuit, and/or a resolution circuit. In addition, it will be appreciated that the various operations, processes, and methods disclosed herein may be embodied in a machine-readable medium and/or a machine accessible medium compatible with a data processing system (e.g., a computer system). Accordingly, the specification and drawings are to be regarded in an illustrative rather than a restrictive sense.

What is claimed is:

1. A method, comprising:
    capturing a sensory data of an environment encompassing the wearable device when a recording module of a wearable device is enabled;
    wirelessly communicating the sensory data to a remote storage device,
    setting an interval in which the wearable device is to periodically communicate with a data processing system communicatively coupled with the wearable device through the Internet network through a user interface accessible through an Internet connected computing system to provide an option to a user of the wearable device to configure whether the wearable device is to optionally communicate with the data processing system whenever an recording of a message is completed,
    selecting which computing devices the wearable device is able to communicate with through the user interface accessible through the Internet connected computing system using a selector of communication devices indicator on the user interface to control which of the computing devices attached to the wearable device are communicable from the wearable device, and
    wherein a means to enable and disable communications with any one of the communication devices attached to the wearable device through the Internet is provided through the user interface,
    wherein a group of recipients is configurable through a communication group selector of the user interface, and
    wherein the wearable device includes a two-way messaging system that communicates data through an Internet network.

2. The method of claim 1 further comprising automatically generating an output data on the wearable device based on a command received wirelessly through a network communicatively coupled with the remote storage device and the wearable device.

3. The method of claim 1 further comprising remotely programming at least one parameter associated with the wearable device based on a configuration data received in a network enabled application.

4. The method of claim 3 wherein the at least one parameter includes at least one of a transmission interval, a recording quality threshold, a wireless range threshold, a communication group, a language selection, a communication identifier associated with a non-wearable communication device, a time of day setting, and a location of the remote storage device.

5. The method of claim 1 wherein the remote storage device is to process between the sensory data and a text data by utilizing at least one of a transcription module and a text-reader module.

6. The method of claim 5 wherein the remote storage device includes a language translation module to translate the sensory data into at least one of a plurality of global languages.

7. The method of claim 1 wherein the recording module is enabled through an interface module having a wireless communication circuitry.

8. The method of claim 1 wherein the remote storage device organizes the sensory data by at least one of a date, a time, a size, a type, a format, and a language.

9. The method of claim 8 wherein the sensory data is at least one or more of an audio data, a text data, a picture data, and a video data.

10. The method of claim 1 wherein the wirelessly communicating the sensory data is automatically performed at periodic intervals of 5 minutes.

11. The method of claim 10 wherein the sensory data is temporarily buffered in a memory module of the wearable device between the periodic intervals.

12. The method of claim 1 wherein a digital clock is displayed on a liquid crystal display on the wearable device, and wherein the wearable device includes a band to fasten the wearable device and to encompass a biological external tissue with the wearable device.

13. The method of claim 1 wherein the data is at least one or more of an audio data, a text data, a picture data, and a video data; and wherein the wearable device includes an alphanumeric keypad to communicate a text message through the Internet network.

14. A system, comprising:
 means for analyzing a sensory data provided through a network by a wearable device of a user by examining a meta-data associated with the sensory data, wherein the meta-data includes at least one of a type and size of the sensory data; and
 means for communicating a parameter threshold setting at least partially derived from the sensory data to a wearable device,
 means for setting an interval in which the wearable device is to periodically communicate with a data processing system communicatively coupled with the wearable device through the Internet network through a user interface accessible through an Internet connected computing system to provide an option to a user of the wearable device to configure whether the wearable device is to optionally communicate with the data processing system whenever an recording of a message is completed,
 means for selecting which computing devices the wearable device is able to communicate with through the user interface accessible through the Internet connected computing system using a selector of communication devices indicator on the user interface to control which of the computing devices attached to the wearable device are communicable from the wearable device, and
 wherein a means to enable and disable communications with any one of the communication devices attached to the wearable device through the Internet is provided through the user interface,
 wherein a group of recipients is configurable through a communication group selector of the user interface, and
 wherein the wearable device includes a two-way messaging system that communicates data through an Internet network.

15. The system of claim 14 further comprising a liquid crystal display module to visualize the sensory data and a clock data on the wearable device; and a leather strap to fasten the wearable device on a biological external tissue.

16. A system, comprising:
 a network;
 a wearable device to express a sensory data of an environment encompassing the wearable device; and
 a data processing system to process the sensory data through the network and to apply an algorithm to analyze the sensory data,
 wherein the data processing system to set an interval in which the wearable device is to periodically communicate with the data processing system communicatively coupled with the wearable device through the Internet network through a user interface accessible through an Internet connected computing system to provide an option to a user of the wearable device to configure whether the wearable device is to optionally communicate with the data processing system whenever an recording of a message is completed,
 wherein the data processing system to select which computing devices the wearable device is able to communicate with through the user interface accessible through the Internet connected computing system using a selector of communication devices indicator on the user interface to control which of the computing devices attached to the wearable device are communicable from the wearable device,
 wherein a user of the data processing system to enable and disable communications with any one of the communication devices attached to the wearable device through the Internet is provided through the user interface, and
 wherein the wearable device includes a two-way messaging system that communicates data through an Internet network.

17. The system of claim 16 wherein the data processing system is to analyze the sensory data by utilizing a resolution module to organize the sensory data based on a user input.

18. A wrist watch, comprising:
 a recording module to capture a present-sense impression data of an environment encompassing the wrist watch;
 a clock module to time stamp the present-sense impression data;
 a memory module to buffer the present-sense impression data during a phased time interval; and
 an interface module to wirelessly transmit the present-sense impression data to at least one recipient device on completion of the phased time interval,
 wherein the remote storage device includes a language translation module to translate the sensory data into at least one of a plurality of global languages,
 wherein a data processing system to set an interval in which the wearable device is to periodically communicate with the data processing system communicatively coupled with the wearable device through the Internet network through a user interface accessible through an Internet connected computing system to provide an option to a user of the wearable device to configure whether the wearable device is to optionally communicate with the data processing system whenever an recording of a message is completed,
 wherein the data processing system to select which computing devices the wearable device is able to communicate with through the user interface accessible through the Internet connected computing system using a selector of communication devices indicator on the user interface to control which of the computing devices attached to the wearable device are communicable from the wearable device,
 wherein a user of the data processing system to enable and disable communications with any one of the communication devices attached to the wearable device through the Internet is provided through the user interface, and
 wherein the wearable device includes a two-way messaging system that communicates data through an Internet network.

* * * * *